(12) United States Patent
Flaherty

(10) Patent No.: US 6,497,401 B2
(45) Date of Patent: Dec. 24, 2002

(54) MOLDED COOLING TOWER

(75) Inventor: John C. Flaherty, Fairfield, NJ (US)

(73) Assignee: Delta Cooling Towers, Inc., NJ (US)

( * ) Notice: Subject to any disclaimer, the term of this patent is extended or adjusted under 35 U.S.C. 154(b) by 0 days.

(21) Appl. No.: 09/891,041

(22) Filed: Jun. 25, 2001

(65) Prior Publication Data

US 2002/0024156 A1 Feb. 28, 2002

Related U.S. Application Data

(63) Continuation-in-part of application No. 09/379,152, filed on Aug. 23, 1999, now Pat. No. 6,250,610.

(51) Int. Cl.⁷ .................................................. B01F 3/04
(52) U.S. Cl. ..................... 261/109; 52/236.7; 52/236.9; 261/DIG. 11
(58) Field of Search ................. 261/108–111, 112.1, 261/112.2, 24, DIG. 11, DIG. 77, DIG. 86, DIG. 87; 52/236.7, 236.9

(56) References Cited

U.S. PATENT DOCUMENTS

| | | | |
|---|---|---|---|
| 2,445,908 A | | 7/1948 | De Flon et al. ...... 261/DIG. 11 |
| 2,596,782 A | * | 5/1952 | Moore ................ 261/DIG. 11 |
| 2,626,129 A | | 1/1953 | Obert ................. 261/DIG. 11 |
| 3,195,870 A | | 7/1965 | Gruber et al. ....... 261/DIG. 11 |
| 3,226,894 A | * | 1/1966 | Burchardt et al. ... 261/DIG. 11 |
| 3,378,971 A | * | 4/1968 | Singer et al. ......... 52/236.7 X |
| 3,384,165 A | | 5/1968 | Mathews ............ 261/DIG. 11 |
| 3,792,841 A | | 2/1974 | Munters ............. 261/DIG. 11 |
| 4,416,836 A | | 11/1983 | Sinek ................. 261/DIG. 11 |
| 4,422,983 A | | 12/1983 | Bardo et al. .................. 261/24 |
| 4,637,903 A | | 1/1987 | Bardo et al. ............ 261/109 X |
| 4,640,070 A | * | 2/1987 | Moffat ................... 52/236.9 X |
| 4,913,710 A | | 4/1990 | Reverdv ............. 261/DIG. 11 |
| 4,976,895 A | | 12/1990 | Bardo ........................ 261/108 |
| 5,028,357 A | | 7/1991 | Bardo ........................ 261/111 |
| 5,227,095 A | | 7/1993 | Curtis .................... 261/111 X |
| 5,412,913 A | * | 5/1995 | Daniels et al. ........ 52/236.9 X |
| 5,902,522 A | * | 5/1999 | Seawell et al. ............ 261/111 |
| 6,237,900 B1 | * | 5/2001 | Drew et al. ................ 261/111 |
| 6,250,610 B1 | * | 6/2001 | Flaherty et al. .......... 261/109 |

FOREIGN PATENT DOCUMENTS

DE   1 127 379   4/1962 .......... 261/DIG. 11

* cited by examiner

*Primary Examiner*—Richard L. Chiesa
(74) *Attorney, Agent, or Firm*—Anthony J. Casella; Gerald E. Hespos

(57) ABSTRACT

A cooling tower is provided for industrial process cooling as well as air conditioning systems. The cooling tower includes a base that has a bottom for supporting the base on a substrate and a plurality of support posts extending away from the bottom. The main body includes a top wall with at least one fan aperture and a plurality of side walls extending downwardly from the top wall. The side walls are dimensioned and configured to telescope onto upper ends of the support posts. Thus, areas beneath the main body and between the support posts define inlets for accommodating airflow generated by the cooling fan mounted in the top wall.

16 Claims, 12 Drawing Sheets

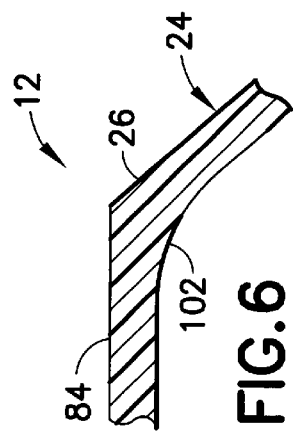
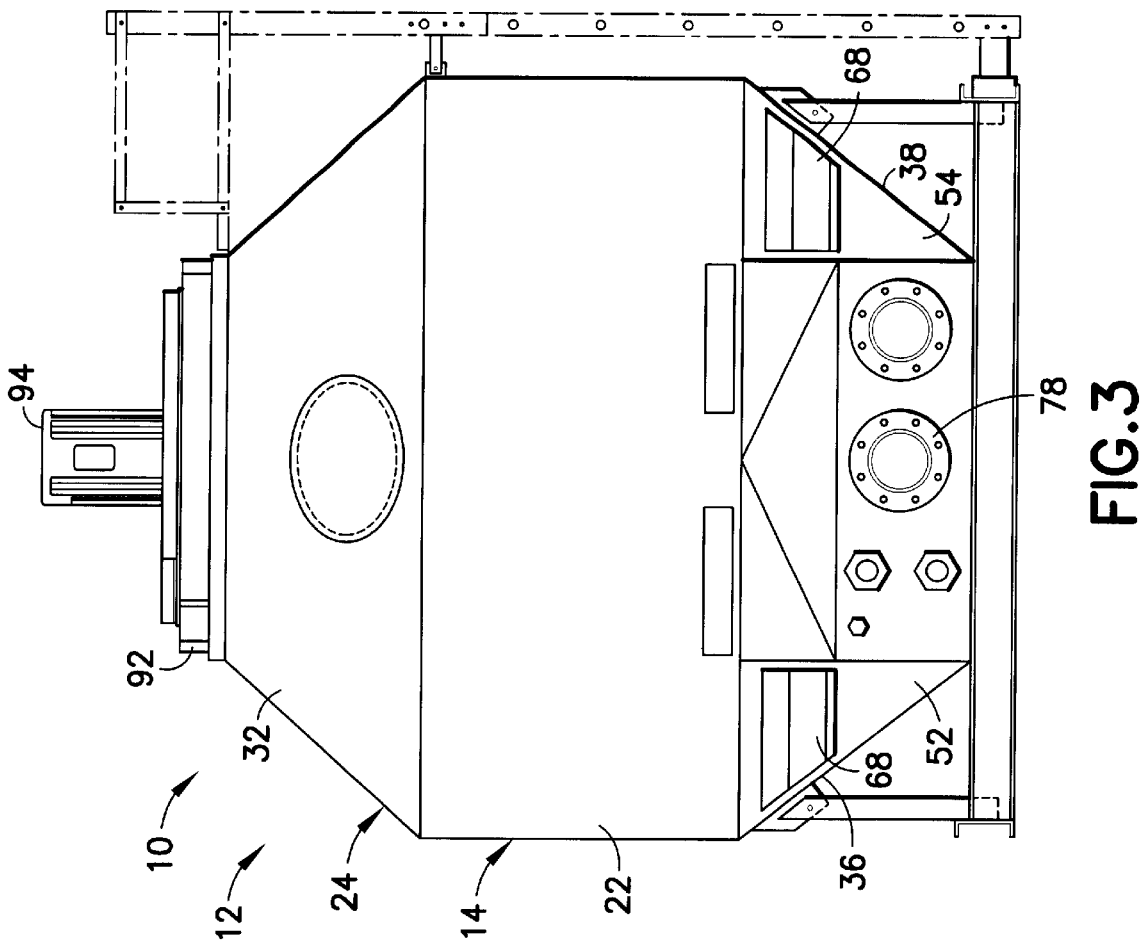

MOLDED COOLING TOWER

This application is a continuation-in-part of U.S. patent application Ser. No. 09/379,152, filed Aug. 23, 1999, now U.S. Pat. No. 6,250,610, issued Jun. 26, 2001.

BACKGROUND OF THE INVENTION

1. Field of the Invention

The subject invention relates to cooling towers for air conditioning systems and industrial process cooling.

2. Description of the Prior Art

Air conditioning systems for large buildings employ cooling towers for carrying out a portion of the heat exchange that is essential to the cooling process. Industrial processes (e.g., chemical production, metals industry, plastics industry, food processing, etc.) generate heat that must be disposed of, often by use of cooling towers. The cooling tower is a housing that channelizes air in proximity to a heat exchange fluid. For example, a heat exchange fluid may be circulated through the cooling tower, and at least one fan may be mounted on the cooling tower to generate a flow of cooling air in proximity to the heat exchange fluid. Heat is transferred from the heat exchange fluid to the air, largely through the evaporation of a small percentage of fluid which substantially lowers the temperature of the primary heat exchange fluid. The cooled heat exchange fluid can then return to the process to perform a heat exchange function for either industrial process equipment or commercial air conditioning system.

The efficiency of an air conditioning system depends, in part, upon the heat exchange carried out in the cooling tower. Large buildings require large cooling towers, and in many instances an array of large cooling towers. Industrial processes depend on cooling towers to prolong the life of other equipment as well as produce top quality production.

The majority of prior art cooling towers are assembled from a plurality of pieces of sheet metal that are mounted to a metallic support frame. These prior art cooling towers typically are manufactured at a location remote from the installation site, and then are shipped to the installation site in a substantially assembled form. These large metallic prior art cooling towers are fairly heavy, and therefore require extensive structural support and greater transportation costs. Furthermore, the size and weight of prior art cooling towers complicates the hoisting and installation of the cooling tower onto the roof of the building. Costs of prior art cooling towers also are adversely affected by the labor intensive process for manufacturing and assembling the various metallic components of the prior cooling tower.

In addition to the cost penalties, the metallic sheet material used in prior art cooling towers generates significant vibration related noise due to the rotation of the fans and due to the flow of air through the cooling tower. Noise pollution often requires noise abatement measures that complicate the installation process and that further add to costs.

Prior art metallic cooling towers also are subject to corrosion or rust. Thus, prior art cooling towers have a relatively short life. Corrosion and rust problems can be avoided or deferred by employing corrosion or rust resistant alloys. However, these metallic materials further add significantly to the cost of the prior art cooling tower.

The prior art includes two types of cooling towers made with plastics. The first type of prior art plastic cooling tower is fabricated from a plurality of fiberglass reinforced polyester (FRP) panels that are fastened together. These plastic towers gain strength through the supplemental glass fiber in the plastic. FRP towers are generally more costly than the galvanized metal towers. Additionally these prior art towers have to be caulked at the seams, require many fasteners to hold the tower together and can develop leaks at the many joints.

The other type of prior art plastic towers are vertically oriented unitary cylinders. These towers can be very tall, with heights up to 19 feet. The ratio of the height to the cross-sectional area limits the cooling capability of the tower since cross-sectional are is more determinant of cooling capacity. The excessive height of these towers requires these prior art towers to be shipped with the axis of the cylinder oriented horizontally, which complicates off-loading and installation. These units have also been limited to one fan assembly per cylindrical unit.

In view of the above, it is an object of the subject invention to provide a cooling tower that is lighter weight and more durable than prior art cooling towers.

It is another object of the subject invention to provide a cooling tower that substantially avoids complex and costly assembly of components.

It is an additional object of the subject invention to provide a cooling tower that produces low levels of vibration related noise.

It is also an object to provide a unitary molded plastic tower that is not cylindrical and allows a much higher ratio of cross-sectional area to overall height.

It is also an object to provide a cooling tower that can be shipped fully assembled and upright to ease off-loading and installation.

Still a further object of the subject invention is to provide a substantially corrosion resistant cooling tower.

SUMMARY OF THE INVENTION

The subject invention is directed to a cooling tower that is made substantially from plastic. More particularly, a major portion of the cooling tower is defined by a tower shell that is unitarily molded from a suitable plastic, such as polyethylene. The unitarily molded tower shell may be formed by rotational molding. The tower shell may be molded to include air inlet louvers that are unitarily molded with the body of the tower shell. Additionally, short cylindrical flanges may be molded at the top of the tower shell for accommodating fans and necessary support housings for the fans. Apertures may be molded into the tower shell or may subsequently be cut into the tower shell for accommodating fluid pipes and/or conduits for electric cables. Separate fittings may then be mounted to these molded or cut apertures to accommodate connections with pipes or conduits. These separate fittings may be plastic or metal depending upon specifications of the heat exchange system.

The tower shell preferably is elongated and of polygonal cross-sectional shape, such as an octagonal cross-sectional shape. Thus, the cooling tower may include substantially parallel top and bottom surfaces that are aligned or alignable substantially horizontally. The tower shell may further include at least one vertically aligned or alignable side wall that is unitarily formed to extend continuously around the periphery of the tower shell. Angled connecting walls extend between the side walls and the respective top and bottom walls.

Tower shells in accordance with the subject invention may be of different respective lengths to accommodate different cooling demands. However, all of the tower shells may be of substantially constant longitudinal cross-sectional size and shape. Thus, a larger tower shell may differ from a smaller tower shell primarily by the length and by the number of cooling fans accommodated along the length. This use of a uniform cross-sectional shape for all tower shells enables the tower shells to be manufactured in the same or similar rotational molds. The molds may be rotatable about a horizontal axis and may be adapted to adjust the length of the mold by merely repositioning end wall portions of the mold.

The polygonal cross-section of tower shells in accordance with the subject invention enables a uniform width and depth for the fill material that performs the mass transfer function within the tower shell. Additionally, the tapered bottom portion of the polygonal tower shell defines a concave water sump at the bottom of the tower, while the tapered top section achieves an efficient exit air flow.

The tower also has several strengthening posts designed to provide structural stability where needed. These posts are a corrugated shape that provides more strength than a straight wall. Additional strength is created by conical ends that help support fan systems on the top of the tower.

Strength also is achieved by the rotational molding. In particular, the rotational molding of a structure as large as the subject cooling towers results in greater thicknesses at locations where surfaces meet at an angle. These greater thicknesses effectively define unitary fillets that add to the strength and vibration resistance. The fillets are particularly helpful at the peripheries of the top and bottom walls at the louvers, at the reinforcing flanges and where the fan-mounting flanges meet the top wall. Thus, the subject cooling towers avoid the complex assembling inefficiencies of the prior art and simultaneously enhance strength and efficiency at critical locations.

An alternate cooling tower employs the above-described rotational molding techniques, but is formed from two separately molded parts that can be assembled to one another. More particularly, the alternate cooling tower includes a base unitarily rotationally molded from a plastic material, such as polyethylene, and a main body unitarily rotationally molded from a plastic material, such as polyethylene. The base preferably includes a bottom wall, a side wall enclosure extending up from the bottom wall and an upwardly concave sump wall connecting upper ends of the side wall enclosure. The sump wall is spaced from the bottom wall in most locations to provide a double wall construction. However support ribs may extend between the bottom wall and the sump wall at selected locations. The base further includes a plurality of support posts projecting unitarily upwardly from the side wall. Each support post preferably is hollow and has a selected cross-sectional shape to achieve sufficient rigidity in the presence of loads applied thereto by the main body and the fans and to support external loads due to vibrations and wind. The posts are spaced from one another to define air inlets between the respective posts. Portions of each post remote from the side and bottom walls of the base or sump define outwardly and upwardly facing steps for supporting the main body.

The main body of the cooling tower in accordance with the second embodiment includes a top wall and a side wall enclosure extending downwardly from the top wall. The top wall preferably includes upper and lower panels and at least one fan support opening. The fan support opening preferably is characterized by a substantially cylindrical flange extending between the panels of the top wall. Fans can be mounted to the flange substantially as described with respect to the first embodiment. The side wall enclosure of the main body also may have inner and outer panels and a bottom edge remote from the top wall. The side wall enclosure is dimensioned to telescope over the top ends of the posts so that the bottom edge of the side wall enclosure can be supported on the steps at the top ends of the posts. Additionally, recesses may be molded between the inner and outer panels of the side walls adjacent the bottom edge for receiving portions of the posts that extend upwardly from the steps.

The side wall enclosure of the main body is further molded to include a plurality of reinforcing ribs or channels. The reinforcing ribs or channels are defined by a plurality of intersecting side wall panels that meet at selected angles. The rotational molding creates unitarily fillets similar to the fillets described with respect to the first embodiment. The fillets have a greater thickness of plastic material. Therefore the fillets provide reinforcement against vibration and enhanced structural rigidity. The reinforcing ribs or channels preferably are disposed to align with the support posts of the base.

The cooling tower of the second embodiment is assembled by positioning a fill material on the top of the posts. The fill material may be any conventional material used for cooling towers, and preferably is a high efficiency spiral wound PVC formed to include a plurality of corrugations that define complex flow channels. The main body then is telescoped onto the upper ends of the posts so that the bottom edge of the side wall enclosure of the main body is supported on the outwardly and upwardly facing steps defined on the respective posts. The portions of the posts spaced inwardly and upwardly from the steps slide into engagement with the recesses formed in the bottom edges of the side wall enclosure on the main body. Bolts or other fastening means can be directed through the side wall enclosure of the main body and into portions of the posts upwardly from the steps to securely fasten the main body to the base or sump portion of the cooling tower.

The double-panel construction and the recesses and support channels unitarily molded into the base and main body provide resistance against loads applied to the cooling tower, such as wind loads and vibration loads attributable to the rotation of the fans and the airflow created by the fans. The load resistance attributable to the recesses in the base and the channels in the main body is enhanced by the fillets created by the rotational molding process employed for both the base and the main body of the cooling tower. The cooling tower also provides a large inlet area between the posts for an inflow of air.

BRIEF DESCRIPTION OF THE DRAWINGS

FIG. 3 is an end elevational view of the cooling tower of FIGS. 1 and 2.

FIG. 6 is a cross-sectional view taken along line 6—6 in FIG. 1.

DETAILED DESCRIPTION OF THE PREFERRED EMBODIMENTS

Figure 1:
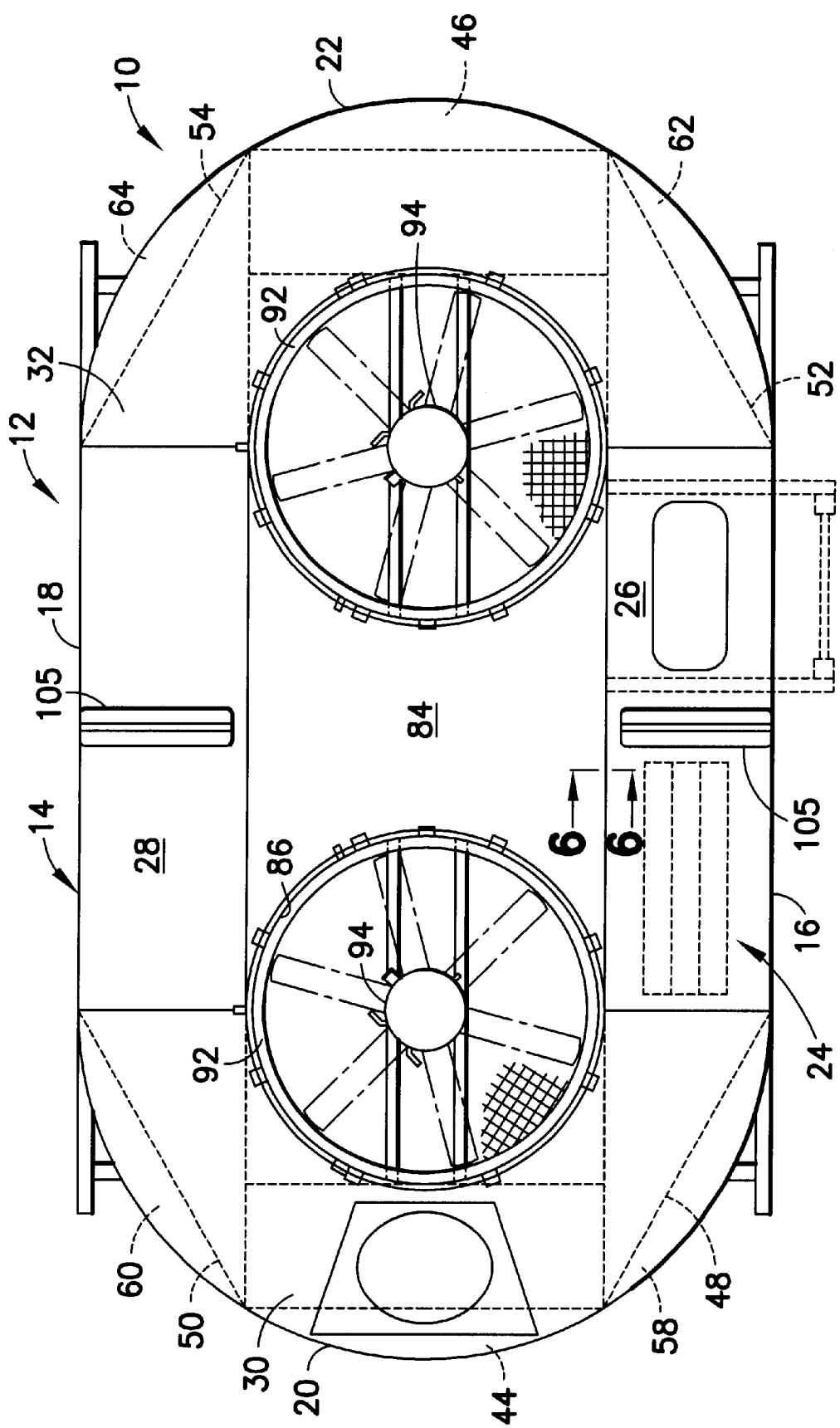
FIG. 1 is a top plan view of a two-fan cooling tower in accordance with the subject invention.
Figure 2:
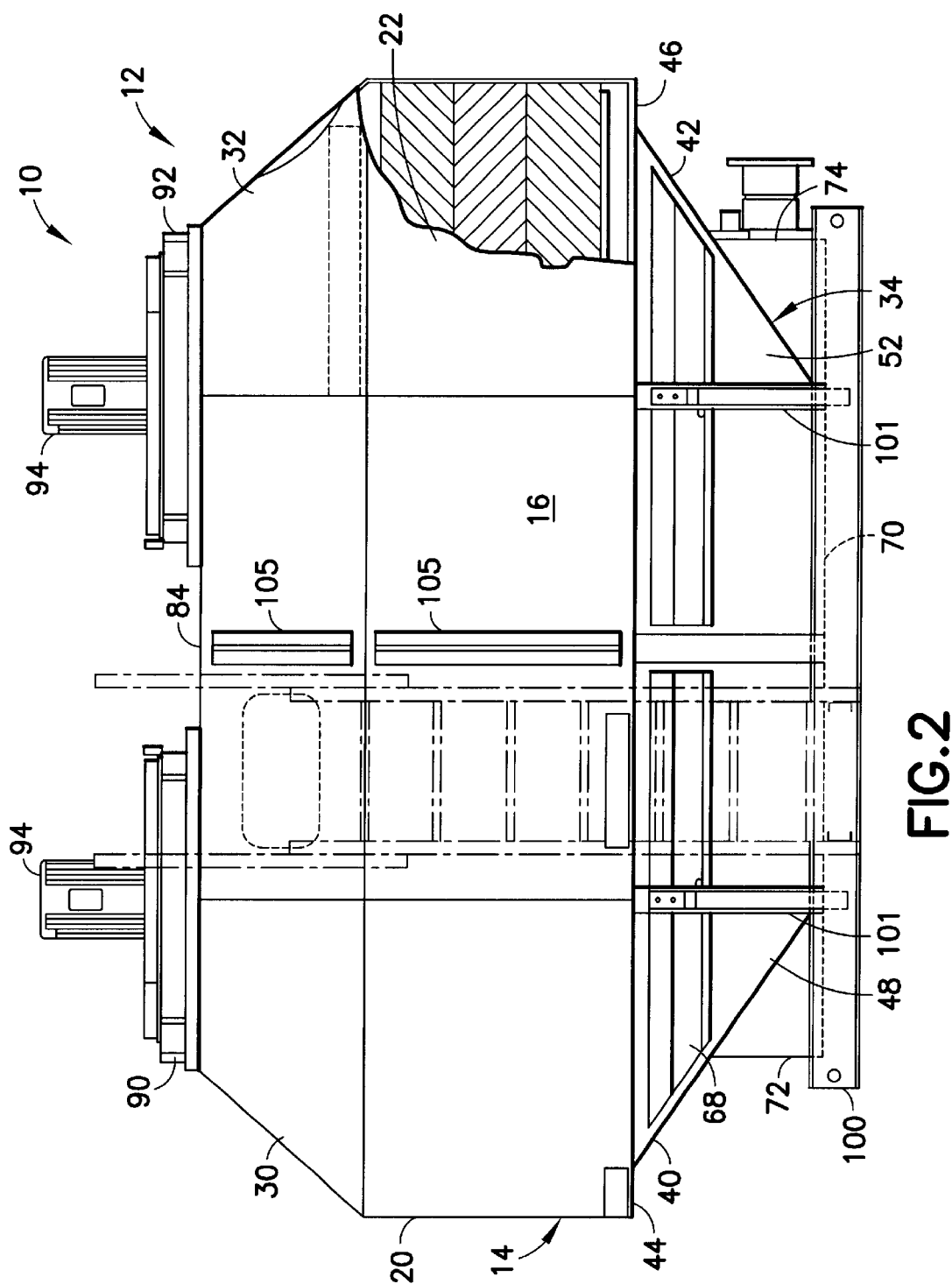
FIG. 2 is a front elevational view of the cooling tower shown in FIG. 1.

A two-fan cooling tower in accordance with the subject invention is identified generally by the numeral 10 in FIGS. 1–3. The cooling tower 10 includes a tower shell 12 that is unitarily molded from polyethylene in a rotational mold. The tower shell 12 is molded to include a substantially vertically aligned side wall 14 extending continuously about the tower shell 12. The side wall 14 includes planar parallel front and rear sections 16 and 18 that extend between semi-cylindrical end sections 20 and 22.

The tower shell 12 further includes the tapered top connecting wall 24 extending unitarily from the side wall 14. The top connecting wall 24 includes planar front and rear sections 26 and 28 respectively which extend unitarily from the planar front and rear side wall section 16 and 18 respectively. Additionally, the tapered top connecting wall 24 further includes conically generated end sections 30 and 32 respectively which extend upwardly and inwardly from the semi-cylindrical sections 20 and 22 respectively of the side wall 14.

The tower shell 12 further includes a tapered bottom connecting wall 34 extending unitarily downwardly and inwardly from the side wall 14. More particularly, the tapered bottom connecting wall 34 includes front and rear panels 36 and 38 that extend from the planar front and rear sections 16 and 18 respectively of the side wall 14. The tapered bottom connecting wall 34 further includes planar bottom end panels 40 and 42 that extend angularly inwardly from opposite ends of the tower shell 12. Upper ends of the end panels 40 and 42 are connected to the side wall 14 by substantially horizontal chordal support panels 44 and 46 respectively. Triangular corner panels 48, 50, 52 and 54 extend between the front and rear panels 36 and 38 and the end panels 40 and 42 of the tapered bottom connecting wall 34. More particularly, the triangular corner panel 48 extends between the front panel 36 and the end panel 40. The triangular corner panel 50 extends between the rear panel 38 and the end panel 40. The triangular corner panel 52 extends between the front panel 36 and the end panel 46, while the triangular corner panel 54 extends between the rear panel 38 and the end panel 42. Upper ends of the lower corner panels 48–54 are connected to lower portions of the side wall 14 by horizontal chordal support panels 58–64. The chordal support panels 44, 46 and 58–64 provide necessary structural support for the tower shell 12 and also support the PVC fill 66 disposed in the tower shell. The front and rear lower panels 36 and 38 and the triangular lower corner panels 48–54 all are molded to include louvers 68 for accommodating an upward air flow.

The tower shell 12 further includes a planar bottom wall 70 of substantially rectangular configuration extending unitarily between the lower edges of the front and rear panels 36 and 38 and the end panels 40 and 42. The tower is mounted on a support platform 100 constructed of steel or fiberglass reinforced plastic (FRP) that uniformly supports the planar bottom 70 of the tower. This support platform also has support legs 101 that protrude perpendicular to the bottom of the tower to provide additional support for the side walls 14. End support enclosures 72 and 74 extend unitarily downwardly from the lower end panels 40 and 42 and terminate in substantially coplanar relationship with the bottom wall 70. Portions of the end enclosure 74 are provided with circular apertures 78 extending therethrough for accommodating fittings to deliver electrical conduits and pipes to the cooling tower 10. Strengthening posts 105 are molded corrugations placed several places in the tower to provide enhanced strength over a straight wall.

The tower shell 12 further includes a substantially oval top wall 84 which extends unitarily between and joins upper end regions of the tapered upper wall 24. The top wall 84 is molded to include first and second circular fan openings 86 and 88 respectively.

As shown most clearly in FIG. 2, the tower shell 12 assumes a substantially octagonal profile when viewed from the front and from the rear. Additionally, as shown in FIG. 3, the tower shell 12 assumes a substantially octagonal profile and cross-section when viewed from the left or right ends.

As noted above, the tower shell 12 is used with fittings at apertures 78 in the end enclosure 74. Still further, a coated steel fan ring 92 may be mounted to each of the fan apertures 86 and 88 in the top wall 84. Fans 94 along with the appropriate hardware and motors then are mounted to the fan rings 92 for generating an upward flow of air through the louvers 68 and out of the fan apertures 86 and 88.

Figure 4:
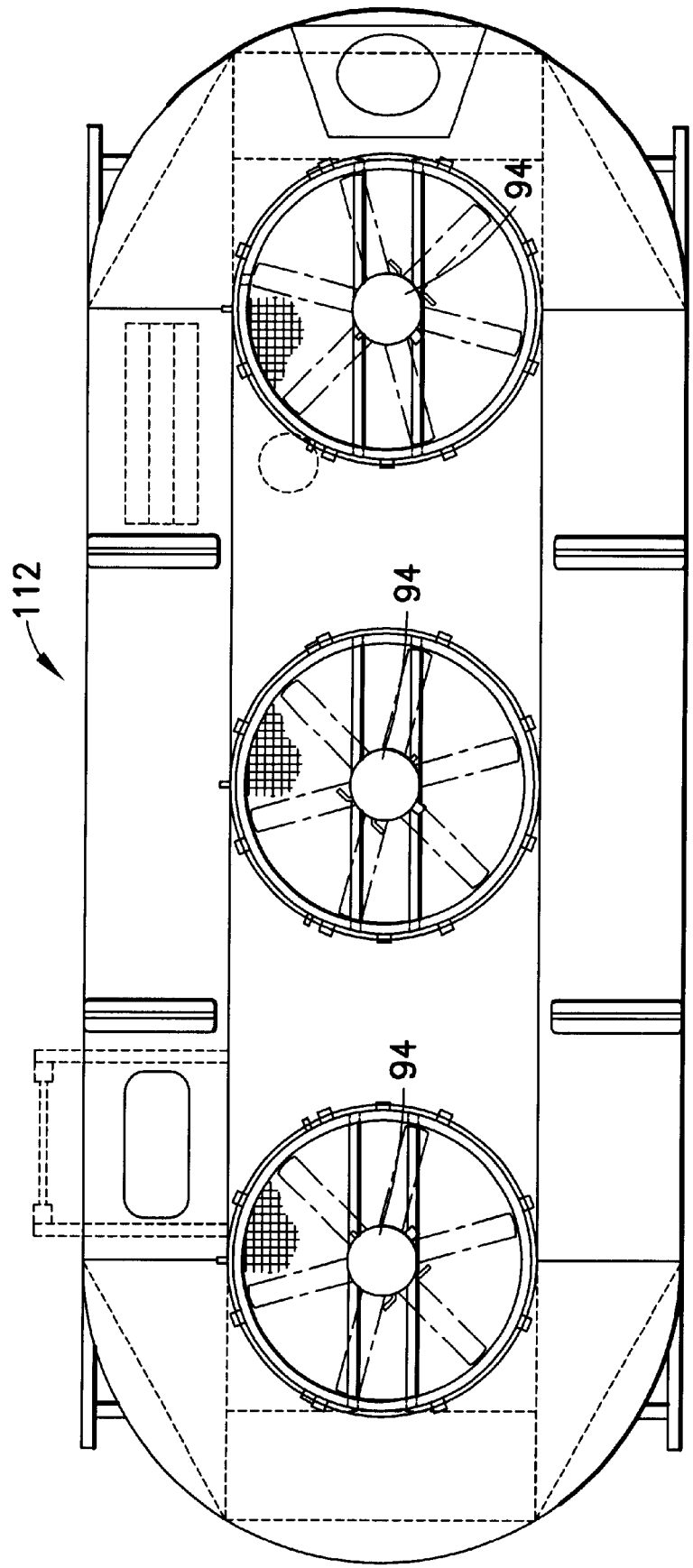
FIG. 4 is a top plan view of a three-fan cooling tower in accordance with the subject invention.
Figure 5:
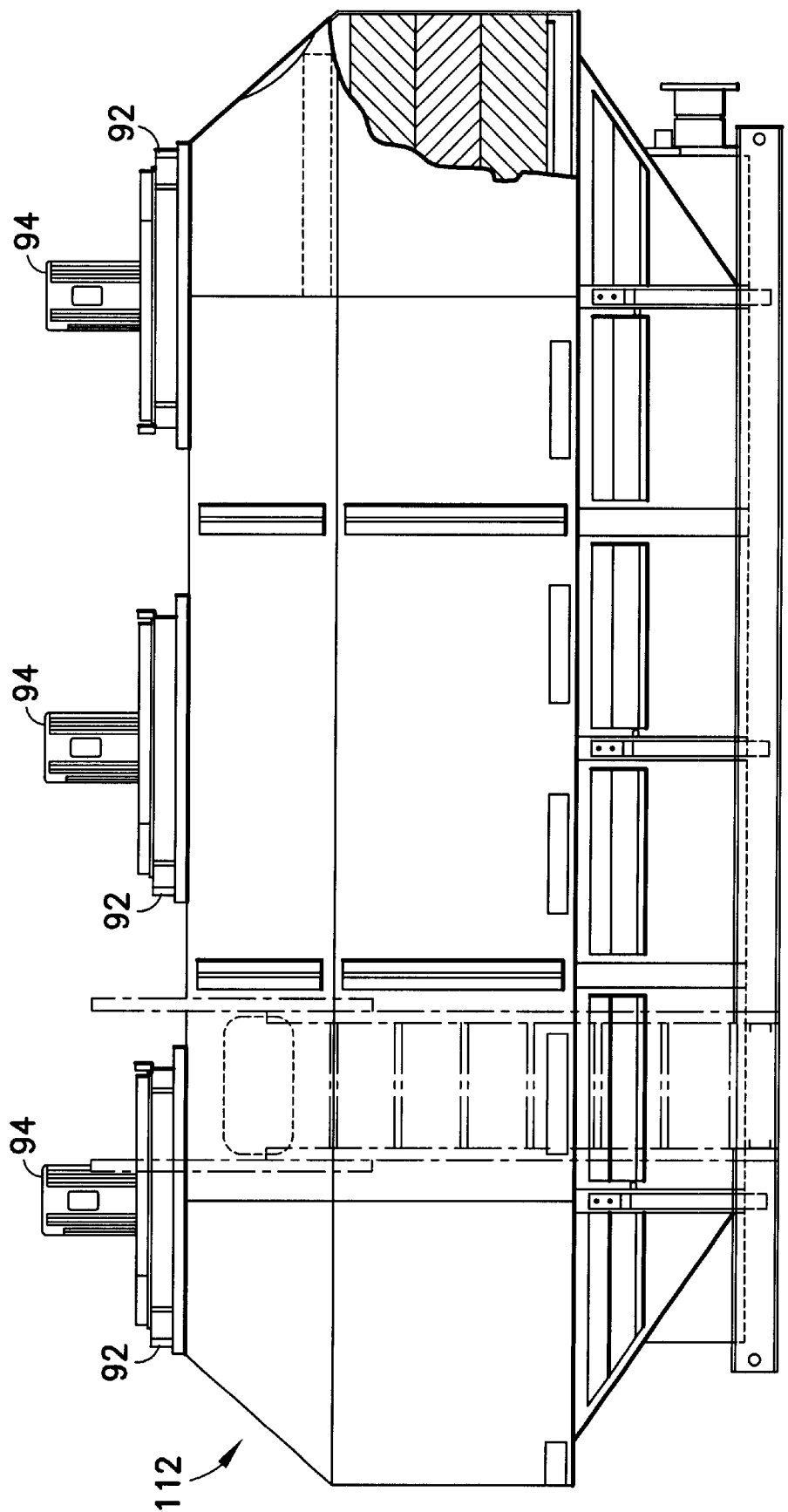
FIG. 5 is a front elevational view of the three-fan cooling tower shown in FIG. 4.
Figure 7:
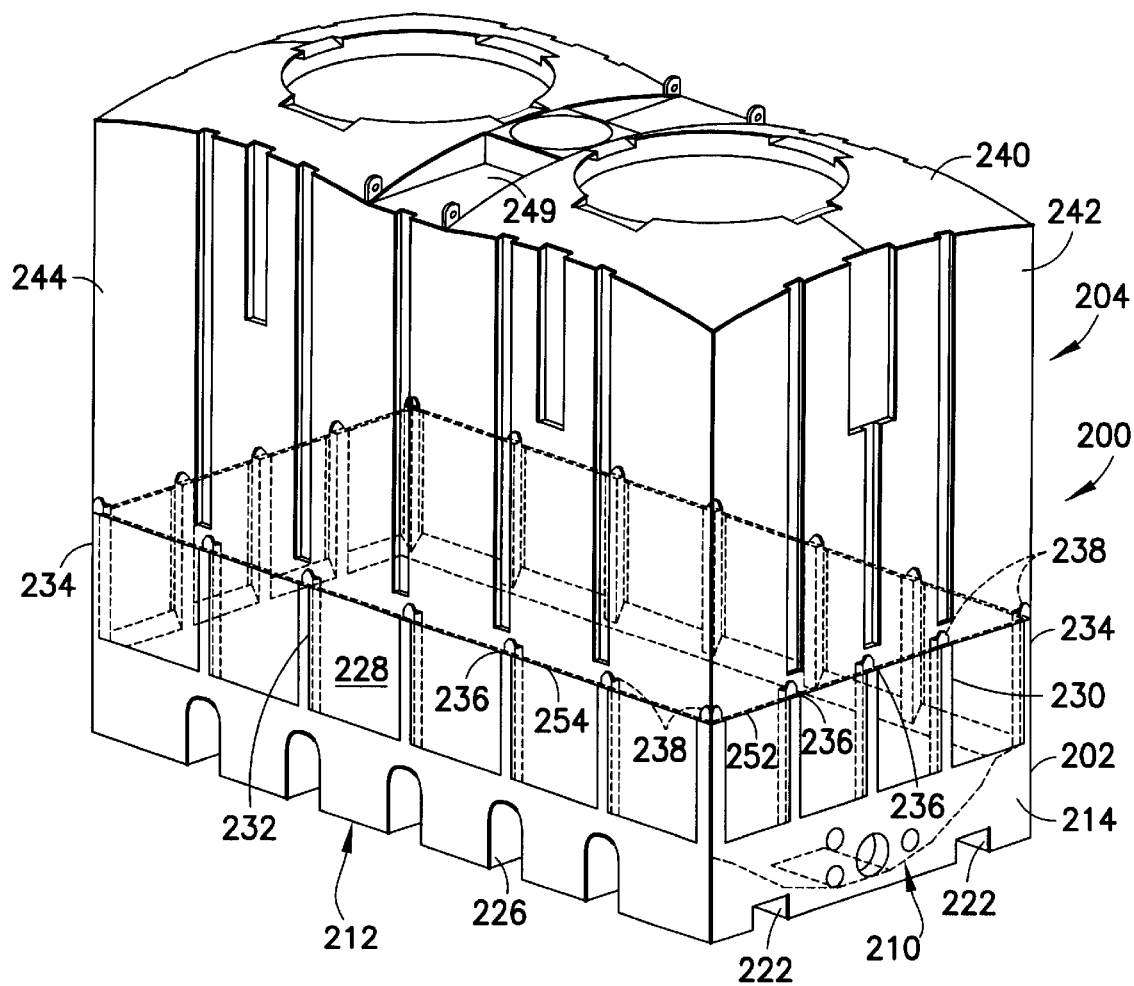
FIG. 7 is a perspective view of an alternate cooling tower in accordance with the subject invention.

The tower shell 12 is unitarily formed in a rotational mold that rotates about an axis extending from left to right in FIG. 1. The mold may be elongated to provide a larger tower shell as shown in FIGS. 4 and 5 respectively. More particularly, FIGS. 4 and 5 show a tower shell 112 that is structurally and functionally similar to the tower shell 12 shown in FIGS. 1–3. Additionally, the end view of the tower shell 12 shown in FIG. 3 is substantially identical to the end view for the tower shell 112. However, the tower shell 112 differs by being sufficiently elongated to accommodate a third fan. Furthermore, additional supports are provided at the tapered lower front and rear panels, on planar portions of the side panels and on the elongated planar portions of the upper panel. The tower shell 12 shown in FIGS. 1–3 defines an overall length of approximately 15 feet. In contrast, the tower shell 112 shown in FIGS. 4 and 5 to define an overall length of almost 22 feet.

The rotational molding results in greater thickness at locations where walls, panels, flanges and/or posts meet at an angle. For example this greater thickness defines a unitary fillet 102 as illustrated in FIG. 6 where the oval top wall 84 intersects the planar front section 26 of the tapered top connecting wall 24. The fillets define a thickness approximately twice the thickness of other locations. For example, the nominal plastic thickness at most locations on the tower shell 12 is approximately 0.375 inch. However the unitary fillets define thicknesses of about 0.750 inch. Comparable fillets exist at other intersecting surfaces. In particular, unitary fillets exist at the strengthening posts 105, at the louvers 68, and at the fan apertures 86 and 88. These unitary fillets add to strength and vibration resistance.

Figure 10:
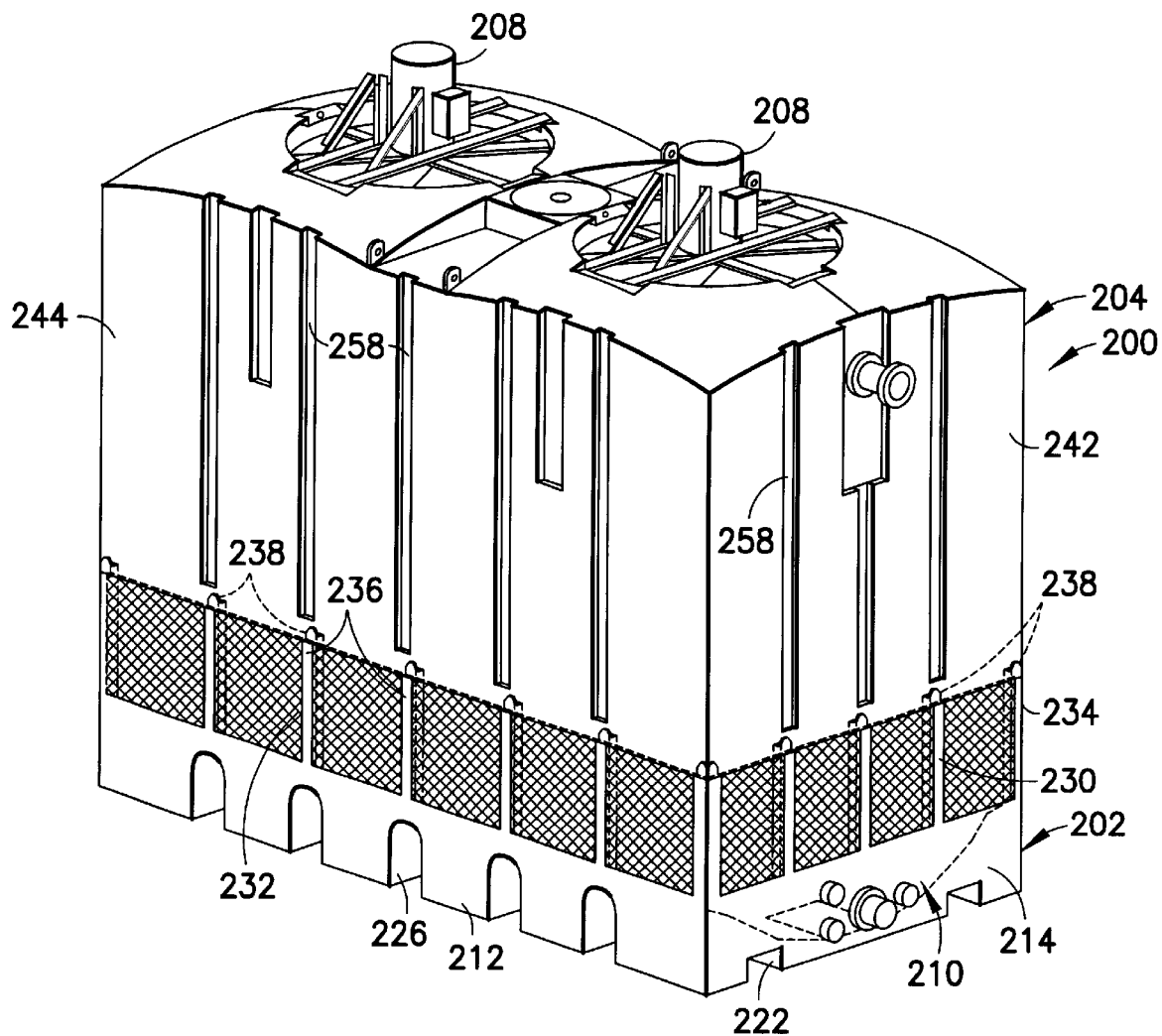
FIG. 10 is a perspective view similar to FIG. 7 but showing the fill material and fans incorporated into the cooling tower.
Figure 11:
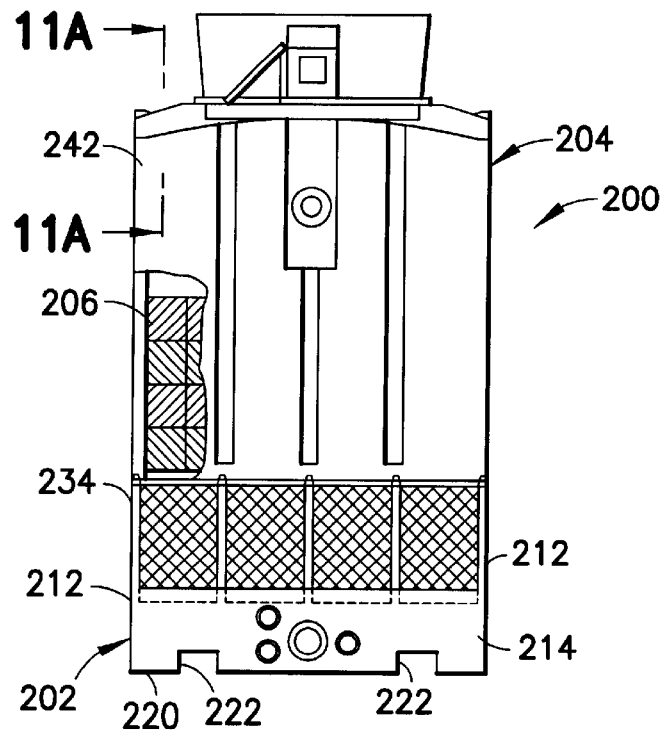
FIG. 11 is an end elevational view of the cooling tower shown in FIG. 10.
Figure 12:
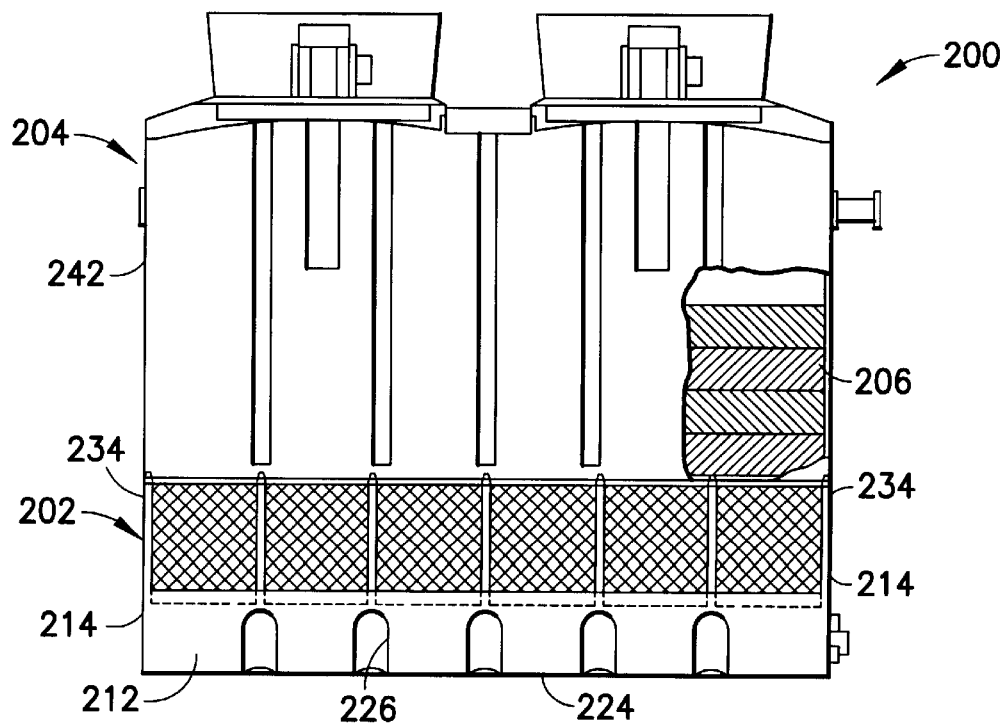
FIG. 12 is a side elevational view of the cooling tower shown in FIG. 10.

An alternate cooling tower in accordance with the subject invention is identified generally by the numeral 200 in FIGS. 7 and 10–12. The cooling tower 200 includes a base 202 and a main body 204. Additionally, the cooling tower 200 is used with a fill material 206 and a plurality of fans 208 as shown in FIGS. 10–12.

Figure 8:
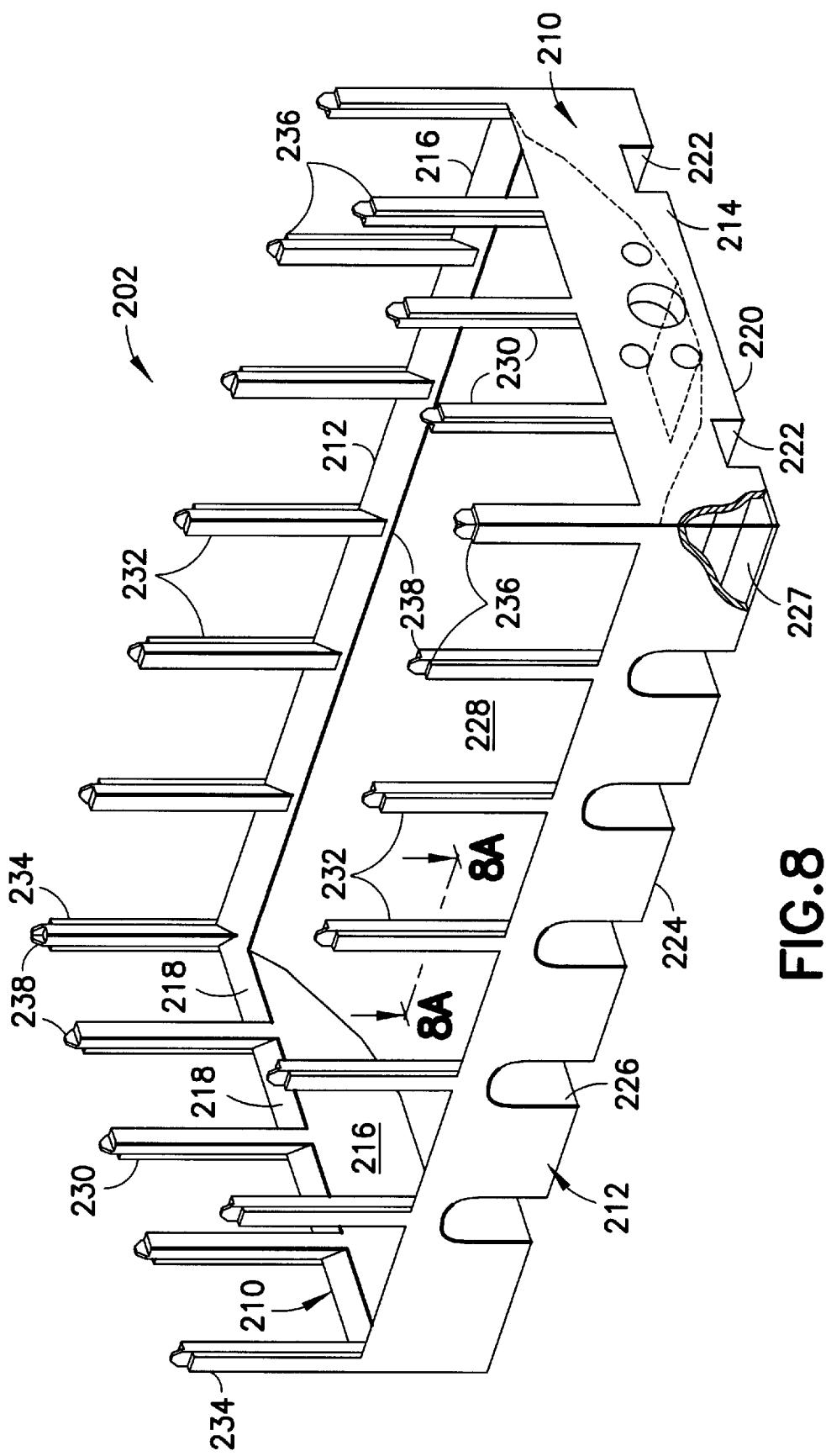
FIG. 8 is a perspective view of the base for the cooling tower of FIG. 7.
Figure 8A:
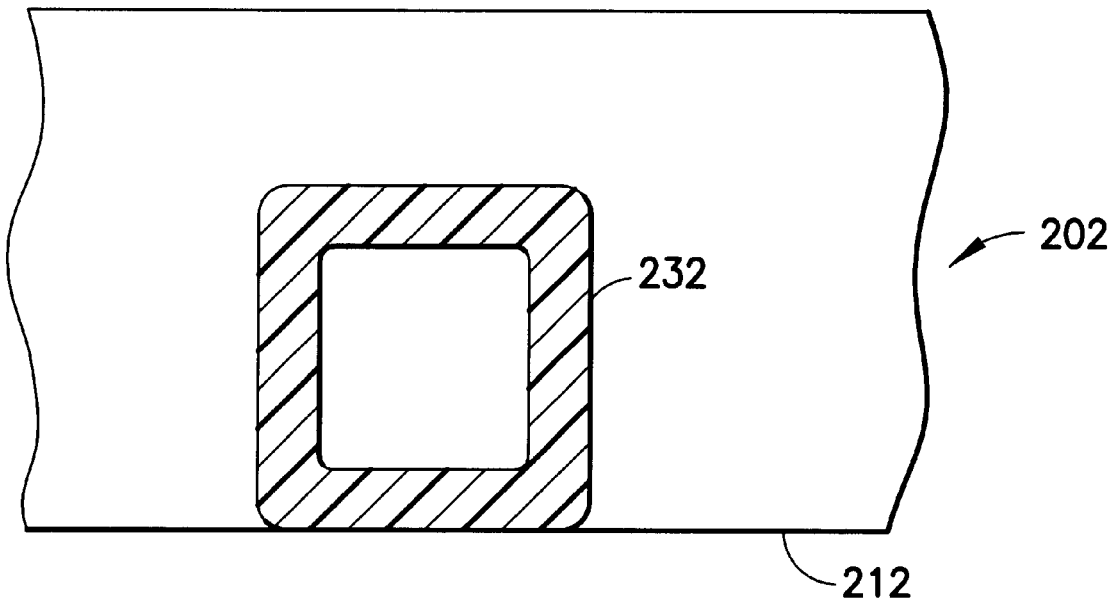
FIG. 8A is a cross-sectional view taken along line 8A—8A in FIG. 8.
Figure 11A:
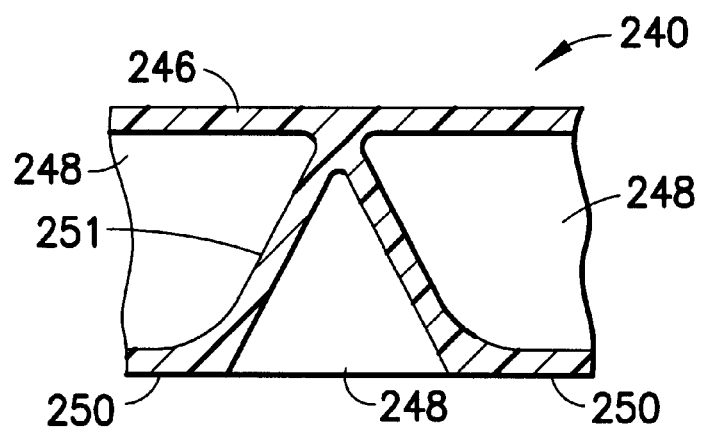
FIG. 11A is a cross-sectional view taken along line 11A—11A in FIG. 11.

The base 202 is unitarily rotationally molded from a plastic material and is shown most clearly in FIG. 8. More particularly, the base 202 includes opposed substantially parallel end walls 210 and opposed substantially parallel side walls 212. The end walls 210 each of are double-panel construction with an outer panel 214 and an inner panel 216. The outer and inner panels 214 and 216 of each end wall 210 are substantially parallel to one another and are spaced apart. Top walls 218 extend angularly between the outer and inner panels 214 and 216 to define the tops of the respective end walls 210. The end walls 210 each include a bottom edge 220. The bottoms edges 220 are substantially parallel, and hence define a plane. The end walls 210 are further characterized by two rectangular mounting channels 222 that extend inwardly from the outer panels 214 and continuously between the end walls 210 as shown in FIGS. 11 and 12. The rectangular channels 222 are dimensioned to nest over I-beams for securely positioning and supporting the base 202 relative to a substrate.

The side walls 212 extend unitarily between the outer panels 214 of the end walls 210. The side walls 212 include bottom edges 224 that are parallel to one another and that lie in the plane defined by the bottom edges 220 of the end walls 210. The side walls 212 are further characterized by support channels 226 that extend inwardly and upwardly from the bottom edges 224. The walls defining the support channels 226 contribute to support of loads applied to the base 202. It is important, that the respective support channels 226 are defined by surfaces that intersect the panels of the side walls 212. Mere openings in the side walls 212 would not perform the reinforcing function of the intersecting surfaces defined by the channels 226. Furthermore, the walls of the support channels 226 join the walls of the mounting channels 222 and enable a transfer of loads to the walls of the mounting channel 222 and to the I-beams engaged in the mounting channels 222.

The base 202 also has a bottom wall 227 that is aligned orthogonal to the end walls 210 and the side walls 212. The bottom wall 227 is joined unitarily with the bottom edges 220 of the outer panels 214 of the end walls 210 and with the bottom edges 224 of the side walls 212. Additionally, the bottom wall 227 joins unitarily with bottom edges of the walls that define the channels 222 and 226.

The base 202 further includes a concave sump wall 228 that extends unitarily between upper ends of the side walls 212 and between the inner panels 216 of the opposed end walls 210. The sump wall 228 is spaced upwardly from the bottom wall 227 and is formed by a plurality of planar surfaces that intersect along lines of intersection that extend parallel to the side walls 212. Thus, the sump wall 228 is substantially symmetrical about an axis extending perpendicularly between the end walls 210. Additionally panels of the sump wall 228 closest to the side walls 212 effectively function as inner panels of the side walls 212.

Hollow rectangular end support posts 230 extend unitarily upwardly from the end walls 210. Similarly, hollow rectangular side support posts 232 extend unitarily upwardly from the side walls 212 at locations aligned with the support channels 226. Hollow rectangular corner support posts 234 extend upwardly at the corner intersections of the end walls 210 with the respective side walls 212. The support posts 230–234 each include an upwardly facing step 236. The steps 236 lie in a common plane substantially parallel to the plane defined by the bottom wall 227. The support posts 230–234 further include inner supports 238 that extend upwardly from the respective steps 236 and substantially perpendicular to the plane defines by the steps 236.

Figure 9:
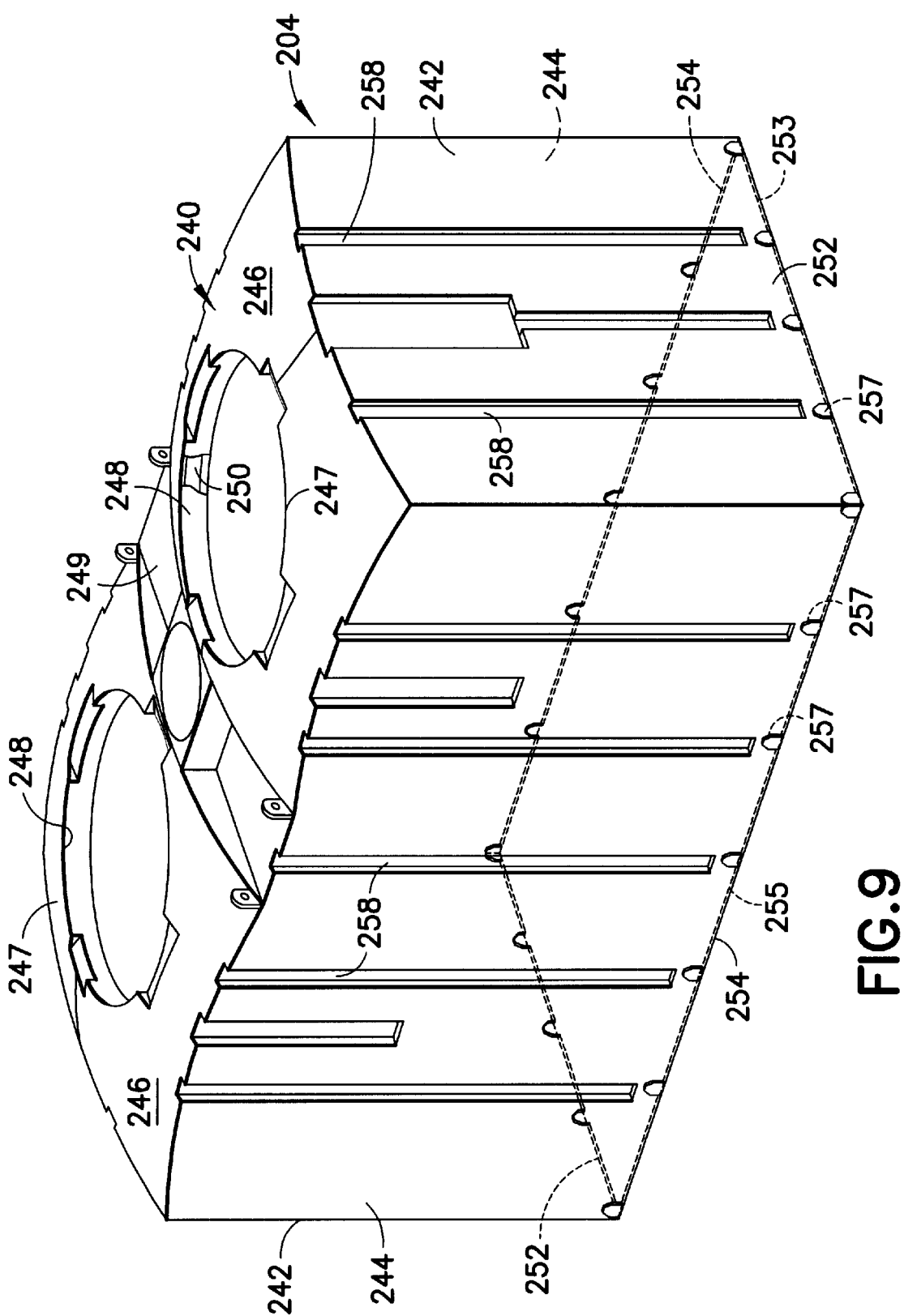
FIG. 9 is a perspective view of the main body of the cooling tower shown in FIG. 7.

The main body 204, as shown in FIG. 9, also is unitarily rotationally molded from a plastic material, such as polyethylene. The main body includes a top wall 240, opposed end walls 242 and opposed side walls 244 each of which is a double-panel construction. The end walls 242 are substantially parallel to one another and extend unitarily downwardly from the top wall 240. Similarly, the side walls 244 are substantially parallel to one another and extend unitarily downward from the top wall 240 and unitarily and orthogonally between the end walls 242.

The top wall 240 is characterized by two convex outer panels 246 disposed respectively in proximity to the end walls 242. The convex outer panels 246 are characterized by fan mounting apertures 247 and cylindrical flanges 248 that extend down from the convex outer panels 246 at the apertures 248. Fans can be mounted to the flanges 248 in the fan mounting apertures 247 substantially as shown in FIGS. 10–12 and as described with respect to the first embodiment. The convex outer panels 246 are separated from one another by a transverse support channel 249 that contributes to the rigidity of the top wall 240. Additionally, inner panels 250 extend unitarily from the lower edges of the respective flanges 248 to the side walls 244, the nearer end wall 242 and the support channel 249. Inverted V-shaped ribs 251 extend between the inner and outer panels 246 and 250 of the top wall 240. Additionally, the inverted V-shaped ribs 251 extend substantially radially from the cylindrical flanges 248.

The end walls 242 have inner panels, outer panels 252 and bottom connecting panels 253. Similarly, the side walls 244 have inner panels, outer panels 254 and bottom connecting panels 255. The bottom connecting panels 253 and 255 define a common plane that extends orthogonal to the respective end walls 242 and side walls 244. The double panel construction of the end walls 242 and side walls 244 contributes to strength and rigidity.

The end walls 242 and side walls 244 are characterized by support-receiving recesses 257 that extend upwardly into the bottom connecting panels 253 and 255 of the respective end walls 242 and side walls 244. The support-receiving recesses 257 are disposed and dimensioned to receive the inner supports 238 of the posts 230–234 on the base 202. Thus, portions of the bottom connecting panels 253 and 255 outwardly from the support receiving recesses 257 can be received on the steps 236 of the posts 230–234.

The end walls 242 and side walls 244 are further characterized by a plurality of vertical reinforcement channels 258. The reinforcement channels 258 are defined by a plurality of intersecting surfaces so that support fillets are defined at the intersections substantially as described with respect to the first embodiment, and as shown in FIG. 6. The reinforcement channels 258 are disposed to align with the posts 230–234 of the base 202.

The base 202 and the main body 204 of the cooling tower 200 can be assembled to one another as shown in FIG. 7 and 10–12 by merely telescoping the lower end of the main body 204 on to the upper ends of the posts 230–234 of the base 202. As a result, the inner supports 238 of the respective posts 230–234 are received in the support receiving recesses 257 adjacent the bottom connecting panels 253 and 255 of the main body 204. Additionally, portions of the bottom connecting panels 253 and 255 in proximity to the support-receiving recesses 257 are supported on the steps 236 of the posts 230–234. As a result, the main body 204 is accurately positioned at a specified height relative to base 202 and is prevented from shifting in longitudinal or transverse directions. The base 202 and the main body 204 can be securely held in their assembled condition by passing bolts or other such fastening means through portions of the end walls 242 and side walls 244 that align respectively with the support receiving recesses 257. Thus, the bolts will engage both the side walls 244 or end walls 242 and the associated inner supports 238 engaged in the support receiving recesses 257.

The fill material 206 shown in FIGS. 10–12 can be supported on the top ends of the posts 230–234 before or after mounting the main body 204 on the base 202 as described above. The fans 208 then can be mounted to the fan mounting apertures 248 substantially as described with respect to the first embodiment. The spaces between the posts 230–234 and immediately below the main body 204 define air inlets for accommodating the flow of air generated by the fans 208 and may be partly closed by louver panels, as shown. The large inlet area achieved with the cooling tower 200 leads to efficient cooling.

The mounting channels 222 in the base 202 provide a very rigid structure that can be supported on two I-beams without a separate steel skid, as had been required in the prior art. The intersecting surfaces defined throughout base 202 and the main body 204, including the hollow support posts 230–234 are characterized by increased-thickness fillets that further enhance rigidity and strength of these portions of the cooling tower 200. Further the alignment of the reinforcement channels 258, with the support posts 232 and with the support channels 226 lead to exceptional strength and load transfer to the I-beams nested in the channels 222.

Figure 13:
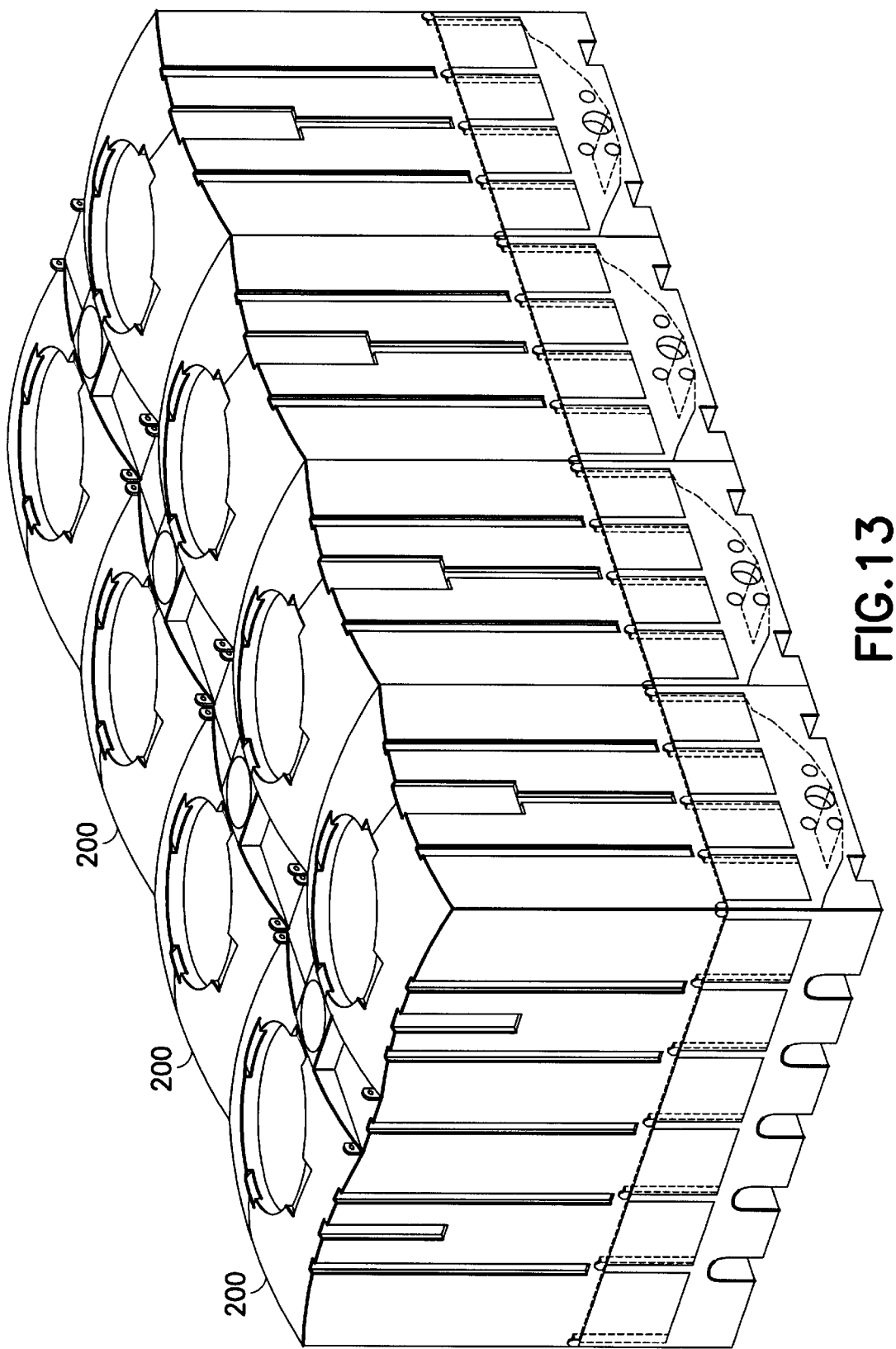
FIG. 13 is a perspective view of an assembly of the cooling towers shown in FIG. 10.

FIGS. 7–12 illustrate with a unitary base 202 and a unitary main body 204. FIG. 13 illustrates an option where a plurality of such cooling towers 202 can be assembled together to define a cooling tower assembly with an unlimited number of cooling fans.

What is claimed is:

1. A cooling tower comprising a unitarily molded base with bottom edges defining a sump having a periphery and a plurality of support posts extending up from the periphery, said posts having upwardly facing steps; and
    a main body unitarily molded from a plastic material and having a top wall with at least one fan aperture for mounting a cooling fan, a side wall enclosure extending down from the top wall and having at least one bottom edge disposed and configured for mounting on the steps of the posts of the base for supporting said main body on the posts of the base, such that air inlets are defined beneath the main body and between the respective posts.

2. The cooling tower of claim 1, wherein the side wall enclosure of the main body is formed with a plurality of support channels defined by a plurality of surfaces meeting at intersections, the surfaces having increased-thickness fillets adjacent the intersections, the fillets being unitary with the respective side wall enclosure for reinforcing the main body.

3. The cooling tower of claim 1, wherein the support posts are hollow and are defined by a plurality of surfaces meeting at intersections, portions of the surfaces adjacent the intersections defining increased-thickness fillets for reinforcing said support posts.

4. The cooling tower of claim 1, wherein the bottom edge of the side wall enclosure of the main body is formed with support-receiving recesses, said support posts being formed with inner supports extending up from the respective steps and engaged in said support-receiving recesses.

5. The cooling tower of claim 1, wherein the base is substantially rectangular, and includes opposed parallel end walls and opposed parallel side walls extending between the ends, the support posts including end support posts extending upwardly from the end walls of the base, side support posts extending upwardly from the side walls of the base and corner support posts extending upwardly from the base in proximity to intersections of the end walls and the side walls.

6. The cooling tower of claim 5, wherein the support posts are substantially parallel and spaced from one another.

7. The cooling tower of claim 5, wherein the base includes a plurality of channels extending between the end walls of the base and substantially parallel to the side walls of the base, the channels extending upwardly into the base for mounting said base on parallel support means secured to a substrate.

8. The cooling tower of claim 1, wherein the side walls of the base include support channels extending inwardly from the side walls substantially to the sump, such that loads imposed on the sump are transferred partly to the support channels of the side walls of the base.

9. A cooling tower comprising:
    a unitarily molded base having a side wall enclosure with a top and a bottom, a bottom wall extending unitarily across the bottom of the side wall enclosure, an upwardly concave sump wall opposed to and spaced at least partly from the bottom wall and extending unitarily across the top of the side wall enclosure, a plurality of hollow support posts extending upwardly from the top of the side wall enclosure, portions of each said post spaced from the side wall enclosure defining an upwardly facing step; and
    a unitarily molded main body having a side wall enclosure with a top and a bottom, said side wall enclosure comprising inner and outer panels spaced from one another at a plurality of locations on said side wall enclosure, a bottom connecting panel extending between the inner and outer panels at the bottom of the side wall enclosure, a top wall extending across the top of the side wall enclosure, the top wall comprising at least one outer panel and at least one inner panel spaced from one another at at least a plurality of locations thereon, a fan opening extending through the top wall from the outer panel to the inner panel and a flange connecting the inner and outer panels at the fan opening, said bottom connecting panel of the side wall enclosure of main body being mounted on the steps of the support posts of the base such that air inlets are defined between the side wall enclosures of the base and the main body and between the respective support posts.

10. The cooling tower of claim 9, wherein the support posts of the base are hollow and are formed by a plurality of intersecting panels.

11. The cooling tower of claim 9, further comprising a plurality of mounting channels formed into the bottom wall of the base, each said mounting channel connecting to spaced apart locations on the side wall enclosure of the base.

12. The cooling tower of claim 11, wherein the base further comprises a plurality of support channels formed in the bottom wall, each said support channel extending transversely from one of said mounting channel to the side wall enclosure.

13. The cooling tower of claim 12, wherein the support posts each comprise an inner support extending up from the step, and wherein the bottom connecting wall of the side wall enclosure of the main body comprises a plurality of support receiving recesses disposed and dimensioned for slidably receiving the inner supports of the respective support posts.

14. The cooling tower of claim 12, wherein the support channels substantially align with the support posts for transferring loads from the support posts to walls defining the support channels.

15. The cooling tower of claim 14, further comprising a plurality of reinforcement channels formed in the outer panel of the side wall enclosure of the main body, a plurality of the reinforcement channels being aligned with the support posts for transferring loads from the main body to the support posts.

16. The cooling tower of claim 9, further comprising a plurality of ribs formed in at least the inner panel of the top wall and extending substantially from the flange to the side wall enclosure.

* * * * *